United States Patent [19]
Otsubo et al.

[11] Patent Number: 5,797,108
[45] Date of Patent: Aug. 18, 1998

[54] SLIP DETECTING DEVICE FOR MOTOR VEHICLE MOUNTED WITH AUTOMATIC TRANSMISSION

[75] Inventors: Hideaki Otsubo; Yasunori Nakawaki, both of Susono, Japan

[73] Assignee: Toyota Jidosha Kabushiki Kaisha, Toyota, Japan

[21] Appl. No.: 518,981

[22] Filed: Aug. 24, 1995

[30] Foreign Application Priority Data

Sep. 1, 1994 [JP] Japan ................... 6-208587

[51] Int. Cl.$^6$ .................................. B60K 28/16
[52] U.S. Cl. .................. 701/51; 701/80; 701/90
[58] Field of Search .............. 364/426.027, 426.01, 364/426.015, 426.033, 426.036, 426.042, 426.043; 180/197; 701/51, 70, 71, 82, 87, 90, 94, 95

[56] References Cited

U.S. PATENT DOCUMENTS

| | | | |
|---|---|---|---|
| 3,741,043 | 6/1973 | Oya et al. | 74/866 |
| 4,220,058 | 9/1980 | Petzold | 74/751 |
| 4,664,773 | 5/1987 | Hiramatsu et al. | 74/866 |
| 5,103,398 | 4/1992 | Akiyama | 364/424.1 |
| 5,159,991 | 11/1992 | Tsuyama et al. | 180/197 |
| 5,224,044 | 6/1993 | Tamura et al. | 364/426.03 |
| 5,265,693 | 11/1993 | Reese et al. | 180/197 |
| 5,279,382 | 1/1994 | Iwata | 180/197 |
| 5,357,435 | 10/1994 | Yasuda | 364/426.03 |
| 5,377,562 | 1/1995 | Kitagawa et al. | 477/110 |
| 5,390,117 | 2/1995 | Graf et al. | 364/424.1 |
| 5,405,301 | 4/1995 | Yagi et al. | 477/120 |
| 5,418,726 | 5/1995 | Yagi | 364/426.03 |
| 5,474,505 | 12/1995 | Seidel et al. | 477/49 |
| 5,562,569 | 10/1996 | Franzke et al. | 477/110 |
| 5,584,541 | 12/1996 | Sone et al. | 303/146 |
| 5,586,953 | 12/1996 | Abo | 477/47 |
| 5,605,201 | 2/1997 | McGinn et al. | 180/233 |

FOREIGN PATENT DOCUMENTS

| | | |
|---|---|---|
| 60-215434 | 10/1985 | Japan. |
| 1-238747 | 9/1989 | Japan. |
| 2-144233 | 6/1990 | Japan. |

*Primary Examiner*—Michael Zanelli
*Assistant Examiner*—Edward Pipala
*Attorney, Agent, or Firm*—Oblon, Spivak, McClelland, Maier & Neustadt, P.C.

[57] ABSTRACT

Disclosed is a slip detecting device for a motor vehicle mounted with an automatic transmission. The slip detecting device is provided with a device for detecting a rotational speed of the specific part in a driving system, whereby occurrence of a driving wheel slip is detected based on the speed variation state in the rotational speed such as the gradient of variation in the output shaft rotational speed when shifting. Therefore, a driving wheel slip can be detected at a low cost, regardless of the accelerator pressed condition.

12 Claims, 4 Drawing Sheets

FIG.3

| SHIFT POSITION | | C₁ | C₂ | C₀ | B₁ | B₂ | B₃ | B₀ | F₁ | F₂ | F₀ |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| | 2 | ○ | | ○ | | ○ | | | ◎ | | ◎ |
| | 3 | ○ | ○ | ○ | | ○ | | | | | ◎ |
| | 4 | ○ | ○ | | | ○ | | ○ | | | |
| 2 | 1 | ○ | | ○ | | | | | | ◎ | ◎ |
| | 2 | ○ | | ○ | ○ | ○ | | | ◎ | | ◎ |
| | 3 | ○ | ○ | ○ | | ○ | | | | | ◎ |
| L | 1 | ○ | | ○ | | ○ | | | | ◎ | ◎ |
| | 2 | ○ | | ○ | ○ | ○ | | | ◎ | | ◎ |

◎ OPERATES ONLY WHEN DRIVING

SLIP DETECTING DEVICE FOR MOTOR VEHICLE MOUNTED WITH AUTOMATIC TRANSMISSION

BACKGROUND OF THE INVENTION

1. Field of the Invention

The present invention relates to a slip detecting device for a motor vehicle mounted with an automatic transmission.

2. Description of the Related Art

When driving, if a driving force applied to the driving wheels is greater than a frictional force between the driving wheels and the road surface, then the driving wheels slip. The slip of the driving wheels could cause various troubles such as loss of energy occurring in the driving section, deterioration of acceleration or stance control performance, wear of tires, driving instability, etc. Therefore it is important to detect the slip so that an appropriate measure may be taken.

A conventional slip detecting device has been known which compares the rotational speed of the driving wheels with that of driven wheels, and detects tire slip from the difference between these rotational speeds.

Japanese Patent Laid-Open No. Hei 60-215434 discloses a device which detects the acceleration of driving wheels by a vehicle speed sensor to thereby detect tire slip from a result of comparison between the detected acceleration and a reference acceleration.

However, in the above-described prior art which compares the rotational speed of the driving wheels with that of the driven wheels, it is necessary to mount another (additional) wheel speed sensor. Furthermore, when all wheels of a motor vehicle are driving wheels as in a fourwheel drive car, the slip can not be detected.

Regarding the slip detecting device disclosed in Japanese Patent Laid-Open No. Hei 60-215434, it is possible to detect the slip in a case of the four-wheel drive car, yet, the slip can be detected only while the accelerator pedal is deeply pressed. Therefore, there exists a limit to the capacity of the slip detection.

SUMMARY OF THE INVENTION

In view of the above-described disadvantages inherent in the heretofore known devices, the aim of the present invention is to provide a slip detecting device for a motor vehicle mounted with an automatic transmission which is of a low cost and is capable of detecting a slip irrespective of the condition of the acceleration.

To accomplish the heretofore aim, the slip detecting device for a motor vehicle mounted with an automatic transmission, as shown in FIG. 1 (A) giving major summary of the device, comprises a rotational speed detecting device for detecting the rotational speed of the specific part in the driving system; a shift detecting device for detecting a shift effected in the transmission; a speed variation state index computing device for computing an index of state of speed variation caused by shifting, based on the rotational speed of the specific part in the driving system detected by the rotational speed detecting device; and a slip detecting device for detecting the occurrence of driving wheel slip according to the index of state of speed variation.

The rotation of the specific part in the driving system (hereinafter "the specific part in the driving system" will be merely described as "the driving part") is supported by the inertia force of the motor vehicle. The inertia force differs depending upon whether the driving wheels are gripping the road surface or are slipping. That is, the inertia force is less when the driving wheels are slipping than when the driving wheels are gripping the road surface.

On the other hand, the rotational speed of the driving part varies when a gear is shifting. However, when the inertia force differs, the state of the speed variation also differs. The state of the speed variation differs depending upon whether the driving wheels are gripping or are slipping.

Conceivable indexes of the speed variation state are for example as follows:

(1) Gradient of variation in the rotational speed of the output shaft when the gear is shifting;

(2) Shifting time required for the rotational speed of the input shaft to change to the synchronous rotational speed;

(3) Variation amount in the rotational speed of the output shaft from the starting point of shifting to its completion;

(4) Variation amount in the rotational speed of the input shaft from the starting point of shifting to its completion; and (5) Ratio of the variation amount of (3) and (4).

In case the driving wheels slip, these indexes of speed variation state vary; (1) varies largely; (2) shortly; (3) largely; (4) small; and (5) for example from 1:10 to 2:3.

The present invention detects the slip according to these indexes of speed variation state.

That is, after the detection of a shift, the index of state of speed variation caused by the shift is computed using the rotational speed of the driving part. Then the occurrence of driving wheel slip is determined in accordance with the index of state of speed variation.

Therefore, according to the present invention, driving wheel slip can be detected regardless of the condition of the acceleration, without particularly requiring an additional sensor. Furthermore it is possible to detect not only a slip in a narrow sense which occurs when the accelerator is pressed, but also a slip which occurs due to a shift effected while the accelerator is released. Accordingly, since it is possible to foresee a condition under which "a slip in a narrow sense will occur if the accelerator is depressed", the present invention is applicable to determine the low μ road (the road whose friction factor μ is low).

Incidentally FIG. 1(B) shows a preferred embodiment which further comprises a driving force changing speed detection device and a slip detection forbidding device. When the driving force has largely changed, the detection of slip occurrence may well be forbidden to prevent an error of slip detection.

BRIEF DESCRIPTION OF THE DRAWINGS

The above and other aims, features and advantages of the present invention will become more apparent from the following description of the invention taken in conjunction with the accompanying drawings, wherein like reference characters designate the same or similar parts, and wherein:

FIG. 3 is a chart showing engagement and disengagement conditions of clutches and brakes.

DETAILED DESCRIPTION OF THE PREFERRED EMBODIMENT

Hereinafter an embodiment of a slip detecting device according to the present invention will be explained in detail with reference to the accompanying drawings.

Figure 1A:
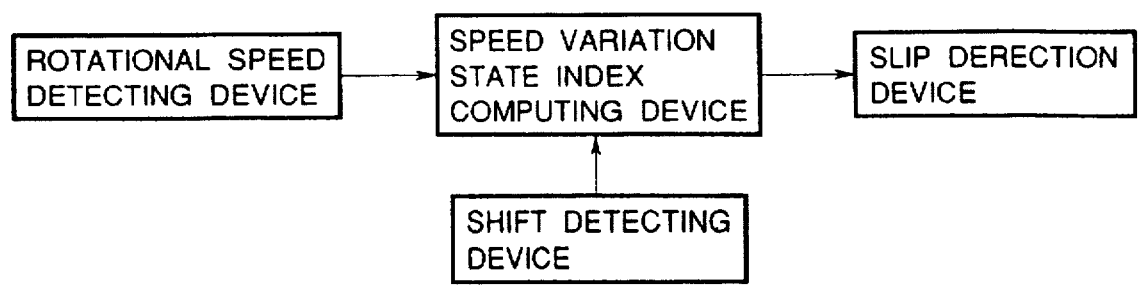
FIG. 1A and 1B are is a block diagram showing a major summary of the present invention.
Figure 1B:
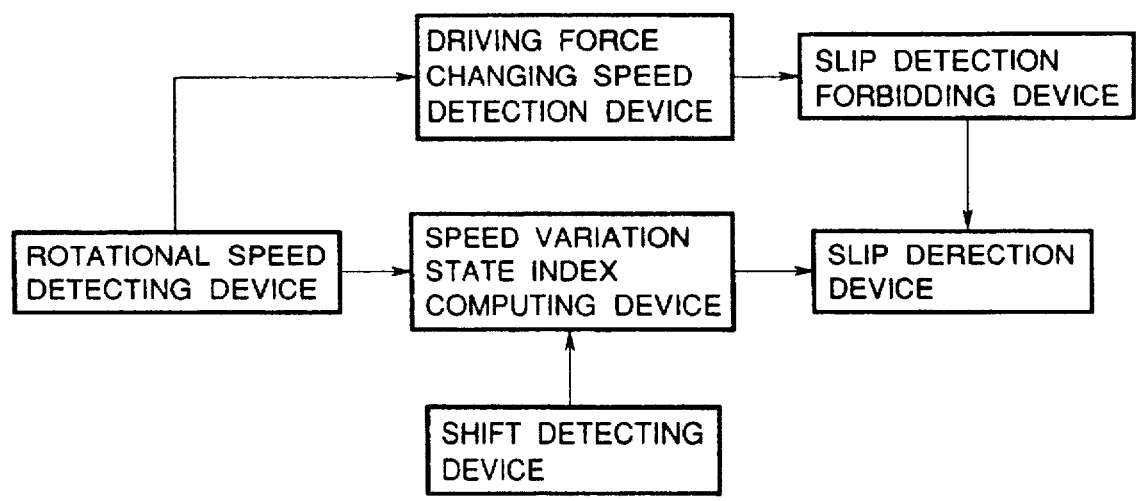
Figure 2:
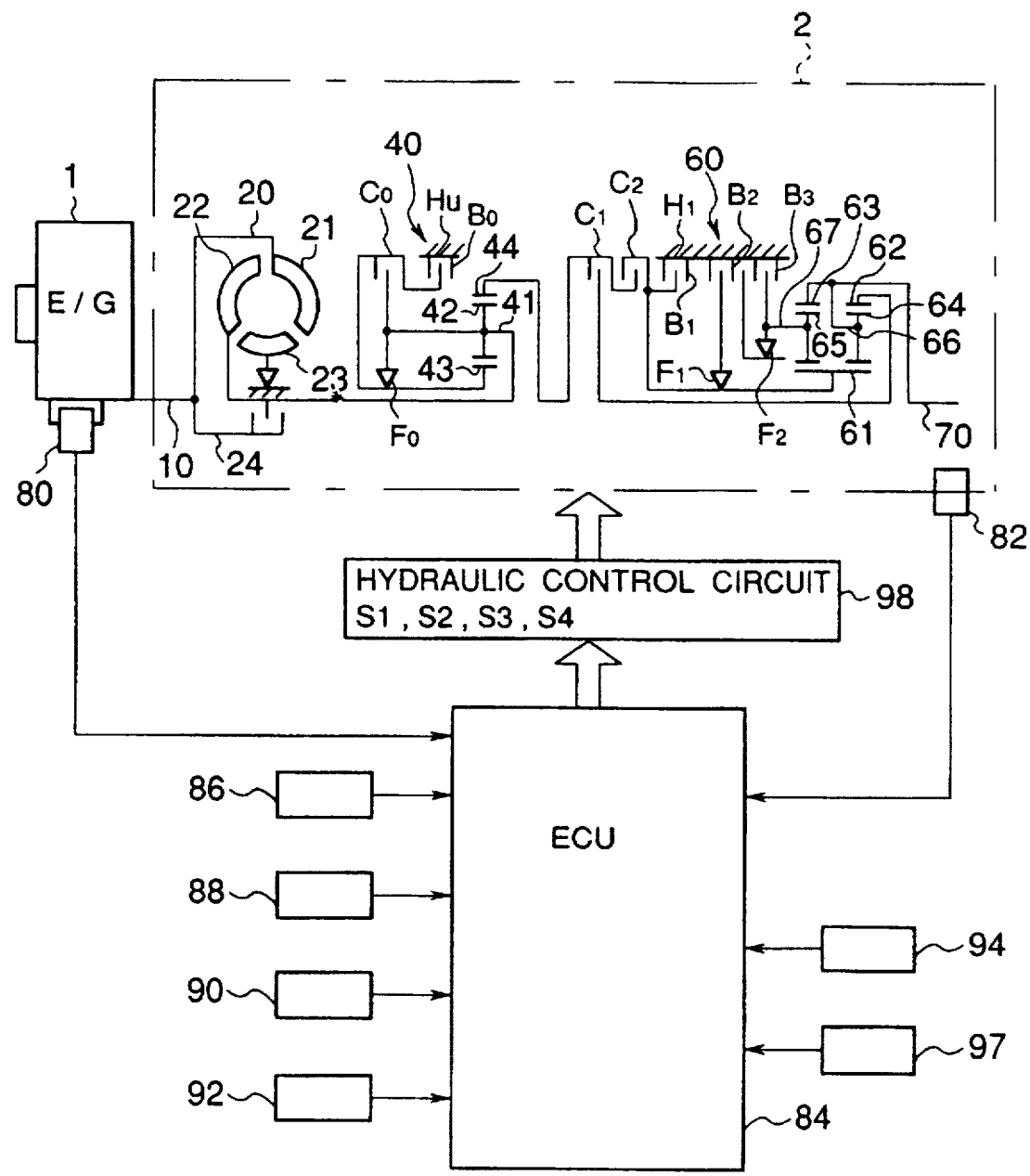
FIG. 2 is a general schematic view of an automatic transmission and a slip detecting device for motor vehicles to which the present invention is applied.

FIG. 2 is a general schematic view of an automatic transmission and a slip detecting device for motor vehicles to which the present invention is applied.

The automatic transmission 2 comprises a torque converter section 20, an overdrive mechanism section 40, and an underdrive mechanism section 60 which provides three forward gear stages and one reverse gear stage.

The torque converter section 20 is a known device having a pump 21, a turbine 22, a stator 23, and a lockup clutch 24, and functions to transmit the output of a crankshaft 10 of an engine 1 to the overdrive mechanism section 40.

The overdrive mechanism section 40 has one set of planetary gear system including a sun gear 43, a ring gear 44, a planetary pinion 42, and a carrier 41. The rotating condition of this planetary gear system is controlled by means of a clutch C0, a brake B0, and a one-way clutch F0.

The underdrive mechanism section 60 has two sets of planetary gear systems comprising a common sun gear 61, ring gears 62 and 63, planetary pinions 64 and 65, and carriers 66 and 67. The rotating condition of these two sets of planetary gear systems and the connecting condition with the overdrive mechanism section 40 and an output shaft 70 are controlled by means of clutches C1 and C2, brakes B1 to B3, and one-way clutches F1 and F2.

A computer 84 serves to control the automatic transmission 2 and also computes indexes of state of speed variation in the driving part to detect a slip of driving wheels. Various control signals are inputted to the computer 84, for example, control signals from: a throttle sensor 80 for detecting the amount of throttle opening which reflects the load of the engine 1 or the accelerator opening; a vehicle speed sensor (speed sensor of output shaft 70) for detecting a vehicle speed; an overdrive OFF switch 86 for forbidding running at overdrive (4th gear stage); a foot brake switch 88 for outputting a signal when a foot brake is depressed; an engine speed sensor 90 for detecting an engine speed; an idle contact switch 92 for outputting the condition of idle contact (ON when the accelerator is released, and OFF when the accelerator is pressed); a pattern select switch 94 for selecting running performance between a power pattern for running with power performance and a normal pattern for running with fuel consumption performance; and a cruise control switch 97 for carrying out the cruise control (automatic running at constant vehicle speed).

An information from the vehicle speed sensor 82 is also used in order to compute the index of state of speed variation in the driving part.

The computer 84 determines the gear stage (1st–4th gear stage) to be selected, in accordance with a preset basic shift map of throttle opening—vehicle speed according to signals inputted from each sensor and switch, and then drives and controls solenoid valves S1, S2, S3 and S4 mounted in a hydraulic control circuit 98 in order to engage or disengage clutches and brakes to thereby accomplish one of four forward gear stages (the 4th gear stage is overdrive) and one reverse gear stage as shown in FIG. 3.

Figure 4:
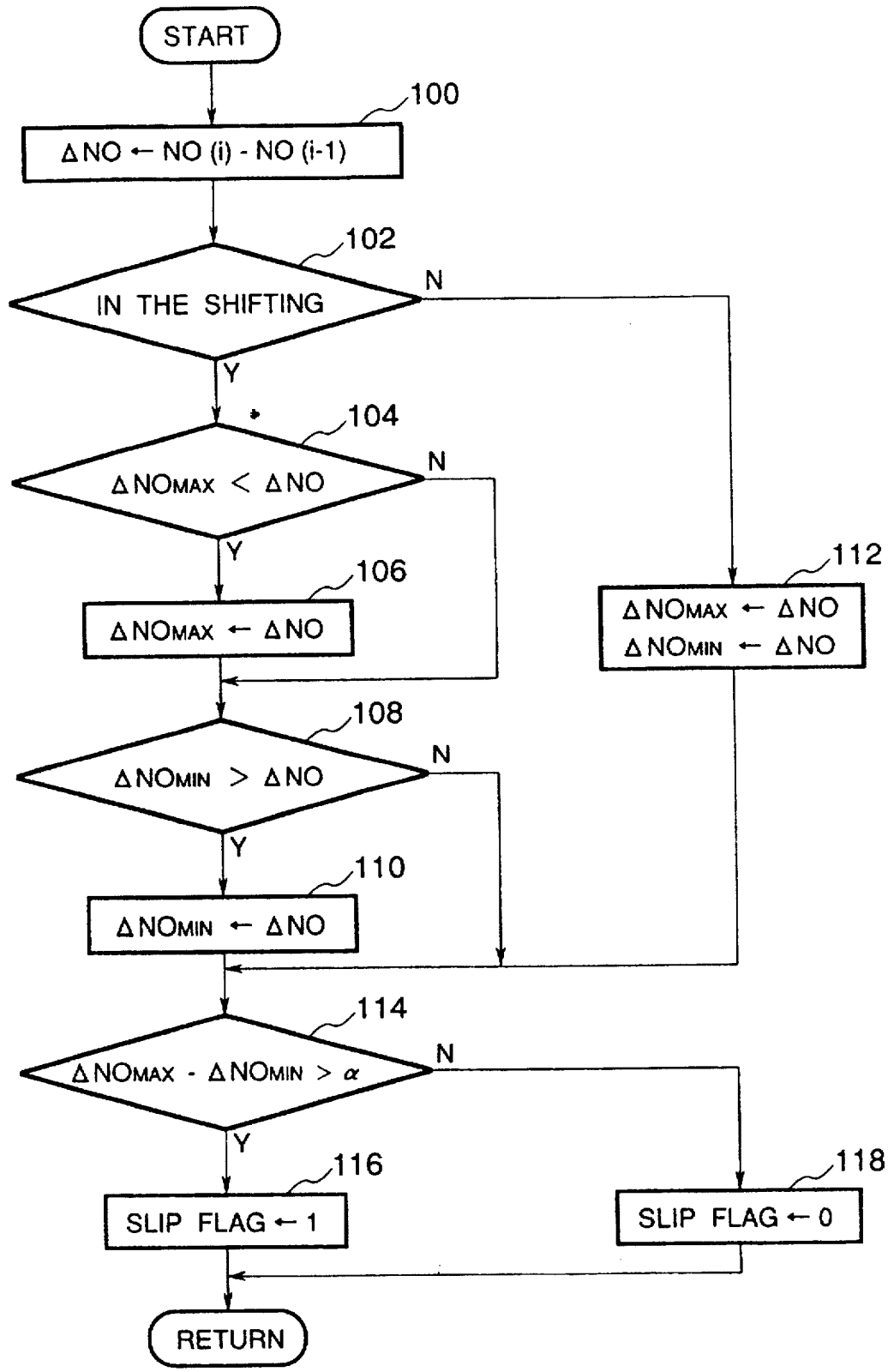
FIG. 4 is a flowchart showing a slip detecting procedure according to the present embodiment.

The computer 84 detects a slip according to a control flowchart shown in FIG. 4.

First, at Step 100, a difference (a speed variation) $\Delta$ No between the output shaft speed No(i) and No(i-1) is determined. Here, the output shaft speed No(i) and No(i-1) are respectively obtained at every predetermined time by the vehicle speed sensor 82.

At Step 102, it is determined whether or not the vehicle is under shifting. When the vehicle is determined to be under shifting, the next Step 104 is taken. At Step 104, it is determined whether or not the speed variation $\Delta$ No determined at Step 100 is greater than the maximum value of the speed variation $\Delta$ No $_{MAX}$ which has been already obtained till that time. If the present (up-to-date) $\Delta$ No is greater than $\Delta$ No$_{MAX}$, the maximum value $\Delta$ No$_{MAX}$ is updated by the present speed variation $\Delta$ No at the next Step 106, the procedure then proceeds to the next Step 108.

If the present $\Delta$ No is not greater than $\Delta$ No$_{MAX}$, the maximum value $\Delta$ No$_{MAX}$ is left unchanged, and the procedure directly proceeds to Step 108. At Step 108, $\Delta$ No is compared with the minimum value $\Delta$ No$_{MIN}$ which has been already obtained till that time.

If the present $\Delta$ No is less than $\Delta$ No$_{MIN}$, the minimum value $\Delta$ No$_{MIN}$ is updated by the present speed variation $\Delta$ No. If the present $\Delta$ No is not less than $\Delta$ No$_{MIN}$, the minimum value $\Delta$ No$_{MIN}$ is left unchanged, and the procedure proceeds to Step 114.

On the other hand, when the vehicle is determined to be not under shifting by Step 102, present $\Delta$ No is updated to the maximum value $\Delta$ No$_{MAX}$ and the minimum value $\Delta$ No$_{MIN}$ at Step 112, from which the procedure proceeds to Step 114.

Next, at Step 114, it is determined whether or not a difference between the maximum value $\Delta$ No$_{MAX}$ and the minimum value $\Delta$ No$_{MIN}$ of the variation in the output shaft speed is greater than a specific value $\alpha$.

When $\Delta$ No$_{MAX}$–$\Delta$ No$_{MIN}$ is greater than $\alpha$, it is considered that, when shifting, there is a great difference between a part of the little variation in the output shaft speed and a part of the great variation in the output shaft speed, namely, the output shaft speed varies suddenly in a specific part. Therefore the occurrence of a slip is detected. In consequence, a slip flag is set at 1 (ON) at Step 116.

Here, the detection is not based merely on the speed variation $\Delta$ No of the output shaft speed No, but based on the difference between the maximum value $\Delta$ No$_{MAX}$ and the minimum value $\Delta$ No$_{MIN}$ of the speed variation $\Delta$ No. This is because "the speed variation $\Delta$ No is great" does not necessarily suggest that the driving wheels are slipping. That is, when the driving wheels are slipping, the output shaft speed No suddenly rises and the speed variation $\Delta$ No certainly increases. However, for instance, when the accelerator is pressed deeply in an attempt to increase the engine output, or when the vehicle is running on a downward slope, the output shaft speed No monotonously increases largely, whereby the speed variation $\Delta$ No becomes a large value (even if no slip is taking place). Similarly, a relatively small speed variation $\Delta$ No can not necessarily be enough to indicate that "no slip is taking place."

Therefore, in the present embodiment, a monotonous change in output shaft speed No which scarcely causes a speed variation $\Delta$ No to change is regarded as no slipping. On the other hand, when the speed variation $\Delta$ No itself varies in the shifting process to thereby increase the difference between the minimum value $\Delta$ No$_{MIN}$ and the maximum value $\Delta$ No$_{MAX}$ of the speed variation $\Delta$ No over the specific value $\alpha$, it is understood that an apparent vehicle speed has varied (not so much as monotonous variation) by the slipping.

When it is determined at Step 114 that the difference between the maximum value $\Delta$ No$_{MAX}$ and the minimum value $\Delta No_{MIN}$ of the speed variation $\Delta No$ is not greater than the specific value $\alpha$, the speed variation $\Delta No$ is considered to come within a range of speed variation state commonly expected in the time of shifting. Accordingly it is determined that no slip is occurring, and at Step 118, a slip flag is set at 0 (OFF).

By the way, when a changing speed in the driving force obtained from the throttle sensor 80, the vehicle speed sensor 82, or the engine speed sensor 90 etc. is high, an error of slip detection is more likely to occur. The reason for this is that when the changing speed in the driving force is great, the difference between the maximum value and the minimum value of the output shaft speed also varies greatly, and accordingly the relationship between the difference and the specific value $\alpha$ becomes liable to be destroyed. Therefore if the changing speed in the driving force is great, the computer 84 could prevent an error of slip detection by forbidding slip detection.

Incidentally the case in which the driving force suddenly changes when running under such a road surface that a slip is likely to occur, is deemed to be the case in which the driver is aware of a slip. In such a case, there should be no problem even if slip detection is forbidden.

Furthermore, in the above-described embodiment, the slip detection was effected by the use of the variation gradient of output shaft rotational speed in the shifting process, which corresponds to (1) of the five indexes of variation states previously mentioned. However other indexes of (2), (3), (4) and (5) or further other indexes may well be used.

According to conventional techniques, it was difficult to decide for example, whether the road was a low-$\mu$ road or not "before starting" because a slip detection could be made only when the accelerator was deeply pressed. In the present invention, the slip detection can be made even when the accelerator is released. Therefore, the low-$\mu$ road can be detected by shifting with the accelerator released just before stopping, for example. The slip detecting device, therefore, is applicable to the automatic control for starting in 2nd gear stage on a low-$\mu$ road or for starting in 1st gear stage on a high-$\mu$ road at the next start, for example.

The present embodiment, as explained above, has the excellent effect that a driving wheel slip can be detected at a low cost, regardless of the accelerator pressed condition.

Furthermore, it is possible to effectively prevent an error of slip detection in the case where the slip detection is forbidden when the changing speed in the driving force is great.

What is claimed is:

1. A slip detecting device for a motor vehicle mounted with an automatic transmission, said motor vehicle having a driving system, comprising:
   a rotational speed detecting means for detecting a rotational speed of a specific part in said driving system;
   a shift detecting means for detecting a shift effected in said automatic transmission;
   a speed variation state index computing means for computing an index of state of speed variation caused by the shift, based on said rotational speed of the specific part in the driving system detected by said rotational speed detecting means; and
   a slip detection means for detecting occurrence of driving wheel slip according to the index of state of speed variation.

2. A slip detecting device for a motor vehicle mounted with an automatic transmission as claimed in claim 1, further comprising:
   a driving force changing speed detection means for detecting a changing speed in a driving force of said driving system; and
   a slip detection forbidding means for forbidding said detection of the slip occurrence when the changing speed is great.

3. A slip detecting device for a motor vehicle mounted with an automatic transmission as claimed in claim 1, wherein,
   said speed variation state index means computes a gradient of variation in rotational speed of an output shaft of said automatic transmission when shifting, as said index of state of speed variation.

4. A slip detecting device for a motor vehicle mounted with an automatic transmission as claimed in claim 1, wherein,
   said speed variation state index means computes a shifting time required for rotational speed of an input shaft of said automatic transmission to change to synchronous rotational speed, as said index of state of speed variation.

5. A slip detecting device for a motor vehicle mounted with an automatic transmission as claimed in claim 1, wherein,
   said speed variation state index means computes a variation amount in rotational speed of an output shaft of said automatic transmission from the starting point of shifting to its completion, as said index of state of speed variation.

6. A slip detecting device for a motor vehicle mounted with an automatic transmission as claimed in claim 1, wherein,
   said speed variation state index means computes a variation amount in rotational speed of an input shaft from the starting point of shifting to its completion, as said index of state of speed variation.

7. A slip detecting device for a motor vehicle mounted with an automatic transmission as claimed in claim 1, wherein,
   said speed variation state index means computes a ratio of variation amount in rotational speed of an output shaft of said automatic transmission, to variation amount in rotational speed of an input shaft of said automatic transmission, as said index of state of speed variation.

8. A slip detecting device for a motor vehicle mounted with an automatic transmission as claimed in claim 2, wherein,
   said speed variation state index means computes a gradient of variation in rotational speed of an output shaft of said automatic transmission when shifting, as said index of state of speed variation.

9. A slip detecting device for a motor vehicle mounted with an automatic transmission as claimed in claim 2, wherein,
   said speed variation state index means computes a shifting time required for rotational speed of an input shaft of said automatic transmission to change to synchronous rotational speed, as said index of state of speed variation.

10. A slip detecting device for a motor vehicle mounted with an automatic transmission as claimed in claim 2, wherein, said speed variation state index means computes a variation amount in rotational speed of an output shaft of said automatic transmission from the starting point of shifting to its completion, as said index of state of speed variation.

11. A slip detecting device for a motor vehicle mounted with an automatic transmission as claimed in claim 2, wherein, said speed variation state index means computes a variation amount in rotational speed of an input shaft from the starting point of shifting to its completion, as said index of state of speed variation.

12. A slip detecting device for a motor vehicle mounted with an automatic transmission as claimed in claim 2, wherein, said speed variation state index means computes a ratio of variation amount in rotational speed of an output shaft of said automatic transmission, to variation amount in rotational speed of an input shaft of said automatic transmission, as said index of state of speed variation.

* * * * *